United States Patent [19]
Snyder et al.

[11] Patent Number: 5,686,117
[45] Date of Patent: Nov. 11, 1997

[54] METHOD AND APPARATUS FOR MANUFACTURING DISC BRAKES

[75] Inventors: David R. Snyder, Stow; William D. Thompson, Canton, both of Ohio

[73] Assignee: Aircraft Braking Systems Corporation, Akron, Ohio

[21] Appl. No.: 676,892

[22] Filed: Jul. 8, 1996

Related U.S. Application Data

[63] Continuation of Ser. No. 584,915, Jan. 11, 1996, abandoned, which is a continuation of Ser. No. 418,844, Apr. 7, 1995, abandoned, which is a continuation of Ser. No. 953,336, Sep. 30, 1992, abandoned.

[51] Int. Cl.$^6$ .......................... B29C 43/18; B29C 43/34
[52] U.S. Cl. .................... 425/112; 425/122; 425/256; 425/395; 425/398; 425/404; 425/429; 425/435
[58] Field of Search ........................ 425/112, 122, 425/129.1, 256, 553, 394, 395, 397, 398, 402, 404, 403.1, 429, 435, 145; 264/257, 134, 135, 112, 114; 249/155, 158

[56] References Cited

U.S. PATENT DOCUMENTS

| | | | |
|---|---|---|---|
| 1,553,921 | 5/1925 | Angst | 249/158 |
| 1,563,292 | 11/1925 | Rawls | 249/155 |
| 1,954,447 | 4/1934 | Greenway | 249/155 |
| 3,097,125 | 7/1963 | Green | 156/38 |
| 3,337,662 | 8/1967 | Spencer | 425/429 |
| 3,412,431 | 11/1968 | Lemelson | 425/429 |
| 3,543,335 | 12/1970 | Meyer | 425/454 |
| 3,807,913 | 4/1974 | Brede et al. | 425/422 |
| 4,692,291 | 9/1987 | Angell, Jr. | 264/109 |
| 4,717,115 | 1/1988 | Schmitz et al. | 249/158 |
| 4,968,468 | 11/1990 | Leinweber | 264/113 |
| 5,165,941 | 11/1992 | Hawley | 425/148 |
| 5,192,387 | 3/1993 | Buckley | 156/275.5 |

FOREIGN PATENT DOCUMENTS

| | | | |
|---|---|---|---|
| 580490 | 10/1976 | Switzerland | 425/429 |
| 2015915 | 9/1979 | United Kingdom . | |

*Primary Examiner*—Khanh P. Nguyen
*Attorney, Agent, or Firm*—Renner, Kenner, Greive, Bobak, Taylor & Weber

[57] ABSTRACT

An apparatus for making carbon discs for brake disc assemblies by feeding continuous strands of fibrous carbon material from spools into a die, the volume of the carbon material so dispensed being continuously monitored. A cutter terminates the dispensing operation and a debulking plate urges all of the fibrous carbon material so dispensed into the die alone. The material is compressed within a cylindrical annular die and, in one embodiment, is submitted to a convection curing oven where the preform is cured. Subsequently, the preform is carbonized, densified, and machined to form a final carbon disc brake. In another emobodiment, a dry preform is fabricated, obviating the need for curing and carbonizing.

14 Claims, 2 Drawing Sheets

METHOD AND APPARATUS FOR MANUFACTURING DISC BRAKES

This is a continuation of application Ser. No. 08/584,915 now abandoned, filed Jan. 11, 1996, which is a continuation of application Ser. No. 08/418,844 filed Apr. 7, 1995, now abandoned, which is a continuation of application Ser. No. 07/953,336 filed Sep. 30, 1992, now abandoned.

TECHNICAL FIELD

The invention herein resides in the art aircraft braking systems and, more particularly, to carbon brake discs employed in the brake disc stacks thereof. More particularly, the invention relates to a method and apparatus for manufacturing carbon brake discs. Specifically, the invention provides a method and apparatus for manufacturing carbon brake discs without the need for carbon fiber prepreg operations.

BACKGROUND ART

The use of carbon disc brakes in the aircraft industry is extensively known. Thermal characteristics and braking efficiencies of such braking systems account for their wide spread acceptance. However, those skilled in the art realize that carbon brakes are expensive, a large portion of the costs incident thereto being the labor intensity required in the manufacture of the carbon discs themselves. Carbon brake discs are formed of carbon fibers which are provided in the form of a tow (one continuous filament) or a roving (a long strand of many short fibers). These carbon fibers may be derived from either pitch or PAN. Those skilled in the art readily understand that a pitch fiber is one in which a thermoplastic derivative of coal tar or petroleum pitch is spun into fiber which is subsequently carbonized by an appropriate technique or method for driving the volatiles therefrom. PAN fibers are poly acryl nitrile fibers which are oxidized, carbonized, and appropriately heat treated. Both pitch and PAN fibers are well known and extensively used in the manufacture of carbon discs for aircraft braking systems.

In the past, the actual formation of the brake discs has been performed in one of two ways. According to the first method, strands of roving or tow have been woven into cloth or felted prior to laying in a die to make a preform that can subsequently be densified. According to a second method, the roving or tow has been impregnated with resin, passed through a staging oven, and subsequently chopped to selected lengths, thus forming a prepreg. These pieces of prepreg are laid in a mold or die by hand to form the shape of a disc preform. Irrespective of the method employed for generating these preforms, the further steps of carbonization and/or densification are necessarily performed on the preform to complete the finished brake disc.

Those skilled in the art are readily aware that the prior art is not given to tailoring the formulations of the disc to satisfy various needs or operational criteria. Particularly, the quantities and proportions of resin and fiber are not given to regulation such that diversification of the formulations or manufacturing the preform, and ultimately the disc, are not possible. Accordingly, there is a need in the art for a method and apparatus for manufacturing the carbon discs for aircraft braking systems in which the labor intensity of the prior art processes can be significantly reduced, while increasing the capability of the diversification of the formulations for the discs.

DISCLOSURE OF INVENTION

In light of the foregoing, it is a first aspect of the invention to provide an apparatus and technique for forming carbon brake discs which obviate the need for making prepregs or for laying up carbon cloth or felt into a preform.

Another aspect of the invention is the provision of an apparatus and technique for forming carbon brake discs which allows for optimizing random orientation of the fibers within the disc of material.

Still a further aspect of the invention is the provision of an apparatus and technique for forming carbon brake discs which accommodates a wide variety of formulations of resins and fibers.

Yet an additional aspect of the invention is the provision of an apparatus and technique for forming carbon brake discs which allows for the use of fibers in their most economical form, as continuous strands of roving or tow.

Yet an additional aspect of the invention is the provision of an apparatus and technique for forming carbon brake discs which are given to implementation with pitch or PAN fiber in tow or roving strands.

The foregoing and other aspects of the invention which will become apparent as the detailed description proceeds are achieved by apparatus for making carbon discs for brake assemblies, comprising: a source of continuous strands of carbon fiber materials; a die; first means for feeding a measured quantity of said continuous strands into said die; second means for compacting and retaining said continuous strands within said die, establishing a composition of carbon fibers in a geometric shape defined thereby; and third means for treating said composition to maintain said geometric shape upon removal from said die.

Other aspects of the invention which will become apparent herein are attained by a method for making carbon discs for brake assemblies, comprising the steps of: placing a cylindrical die beneath a dispensing head; causing relative rotational movement between said cylindrical die and dispensing head; dispensing a predetermined volume of continuous strands of carbon fiber material into said die; compacting said strands within said die and restraining said compacted strands therein; and treating said compacted strands within said die to retain a defined geometric shape.

DESCRIPTION OF DRAWING

For a complete understanding of the objects, techniques, and structure of the invention reference should be made to the following detailed description and accompanying drawing wherein.

BEST MODE FOR CARRYING OUT THE INVENTION

Figure 1:
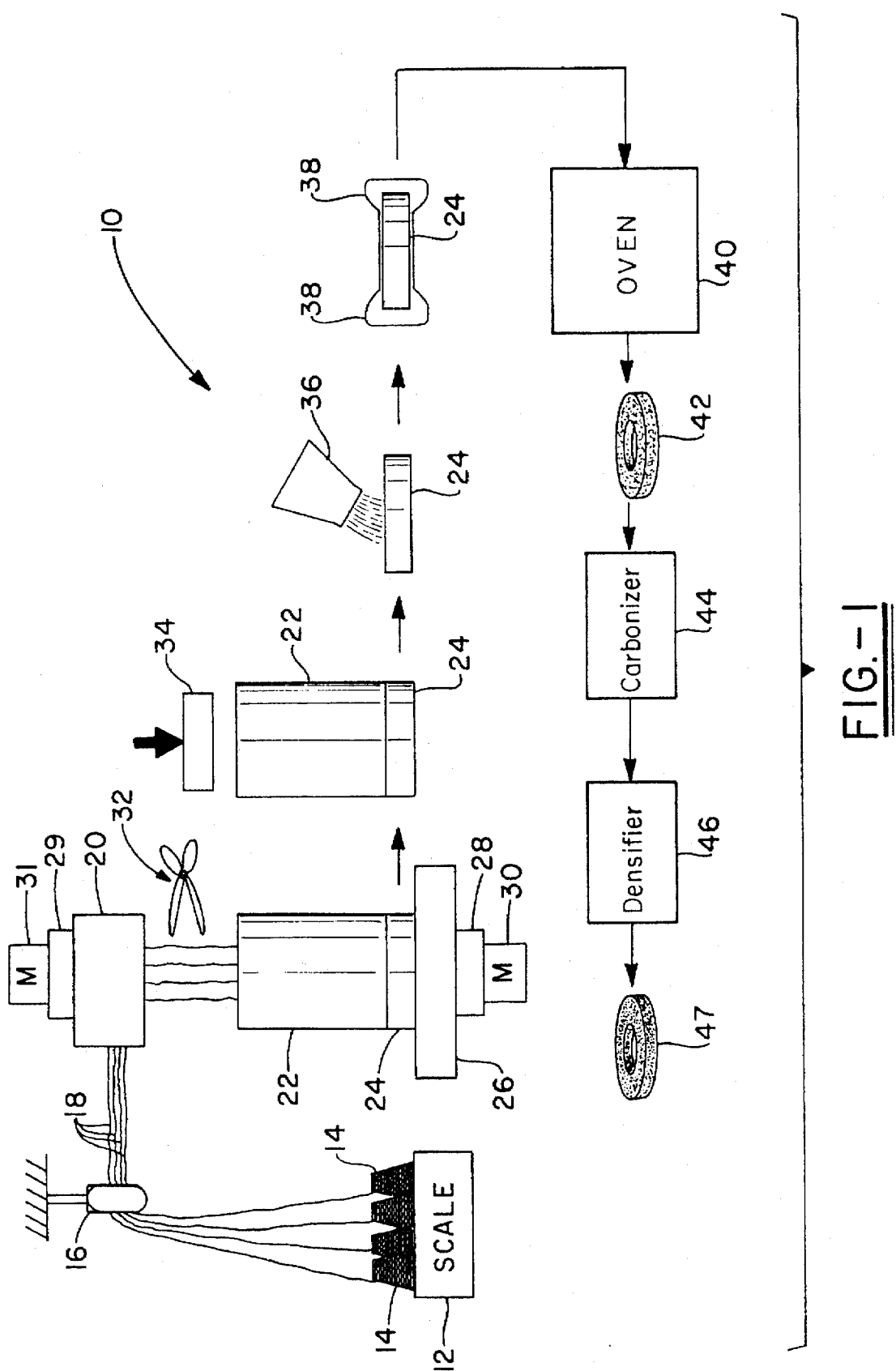
FIG. 1 is an illustrative view of the process for forming a carbon brake disc pursuant to the invention.

Referring now to the drawing and more particularly FIG. 1, it can be seen that a processing system for making carbon brake discs according to the invention is designated generally by the numeral 10. As illustrated, an appropriate scale 12 or other device for measuring weight or mass is provided to receive a plurality of spools 14 of carbon fiber strands thereon. According to the invention, the specific nature of the strands is unimportant for the concept of the invention, and comprise either tow or roving of either pitch or PAN fibers. Additionally, while four such spools 14 are shown received upon the scale 12, it will be readily appreciated that any suitable number of such spools 14 may be employed in accordance with the concept of the invention.

An appropriate despooler 16 achieves the removal of the spirally wound strands 18 from the respective spools 14. The strands 18 pass through an injector head 20 which may be of any suitable nature, either mechanically or pneumatically actuated. The speed of dispensing of the strands 18 by the injector head 20 is typically adjustable, and according to the preferred embodiment of the invention, the injector head 20 is so adjusted that each of the strands 18 is dispensed at the same uniform speed or rate. The strands 18 are injected through a cylindrical sleeve or guide 22 into a cylindrical die 24.

According to the invention, in order to achieve a uniform distribution of the carbon fiber strands 18 into the die 24, relative rotational movement between the die 24 and injector head 20 is desired. For that purpose, a die 24 may be placed upon a carousel 26 which is rotationally motivated through a gearbox 28 by an appropriate motor 30. Of course, the motor 30 may be of variable or fixed speed, the motor speed being selected as a function of the rate of injection of the strands 18 by the injector head 20, the density of the strands, and the like. According to the invention, the gear box 28 may be employed to simply cause the carousel 26 to rotate about a central axis or, to nutate in primary and secondary orbital fashion to satisfy the needs of the filling operation. In this regard, it is also contemplated that a gear box 29 and motor 31 may be connected to the dispensing head 20 to also cause rotational movement thereof. The nutating of the strands 18 as they are dispensed into the die 24 may easily be achieved by having the carousel 26 and die 24 rotate about a first axis which is not coaxial with an axis about which the dispensing head 20 is caused to rotate. Of course, any of numerous dispensing patterns can be achieved in accordance with the concept of the invention by varying the rotational speeds and rotational axes of the die 24 and injector head 20. Such assures uniform distribution of the strands 18 within the die 24.

According to the invention, as the strands 18 are dispensed from the spools 14, the weight or mass of the carbon fiber so dispensed is monitored by the scale 12. When an appropriate predetermined volume has been so dispensed, operation of the injector head 20 is inhibited and an appropriate cutter 32 is actuated to cut the strands 18, ceasing such dispensing and assuring that an appropriate quantity of carbon fiber is maintained within the guide 24 and sleeve 22. In the embodiment just described, at such time four continuous strands of carbon fiber material would be received within the sleeve and die 22, 24. It is also contemplated as a portion of the invention that the cutter 32 may be operated periodically and continuously during the dispensing operation such that a multitude of strands of predetermined short length are dispensed into the sleeve and die 22, 24 during the dispensing operation. Whether the dispensing is achieved in continuous strands, or in shortcut lengths of the carbon fiber material, when sufficient volume has been dispensed as determined by the scale 12, operation of the injector head 20 is ceased and a final cut is made by the cutter 32.

Upon termination of the dispensing operation, the sleeve and die 22, 24 are removed from the carousel 26 and passed to a debulking station where a debulker 34 is axially reciprocated within the sleeve 22 to compact the carbon fiber material into the die 24. As will be appreciated below, the die 24 is of an annular nature, comprising concentric cylinders and, accordingly, the debulker 34 comprises an annular disc which serves to urge the strands from the sleeve 22 into position within the annular cylindrical die 24 alone.

The concept of the invention is applicable to methods employing resins for generating the carbon disc preform, as well as techniques in which the preform is generated in the absence of resin. In the embodiment where a resinous material is employed, it is preferred that approximately 25–40 percent, and most preferably ⅓ of the resin of the formulation be introduced into the die 24 prior to its placement upon the carousel 26 and prior to receipt of any of the strands 18. Following the debulking operation just described, the remaining ⅔ of the resin 36 is added into the die 24 as shown, such resin being preferably evenly distributed over the top of the carbon fiber strands received therein.

After debulking, or addition of the final portion of the resin 36, depending upon the formulation employed, the fibrous carbon material maintained within the die 24 is further compressed to a fixed volume and thickness and secured by means of clamps 38, as shown. In the formulation where resin is employed the assemblage 24, 38 is then passed to an appropriate convection oven 40 where the clamped composition is cured. Upon completion of the curing operation, the assemblage 24, 38 is removed from the curing oven 40 and the carbon disc preform 42 is removed from the die 24 and passed to a carbonizer 44 in which the volatiles of the preform 42 are evaporated or otherwise removed. Subsequently, the disc 42 is passed to a densification chamber 46 where chemical vapor deposition or impregnation of resin or pitch is employed to densify the preform 42 to be suitable for use as a carbon brake disc in an aircraft brake disc stack. Subsequently, the surfaces of the carbonized and densified preform 42 are machined to form a finalized and completed brake disc assembly 47.

Those skilled in the art will appreciate that the process just described may be slightly altered to prepare a "dry preform" in which no resin is employed in the formulation. In such a process, the steps of curing and carbonizing are eliminated and, accordingly, the curing oven 40 may be replaced with a densification chamber and carbonizer 44 may be removed. Otherwise, the process is the same as just described.

Figure 2:
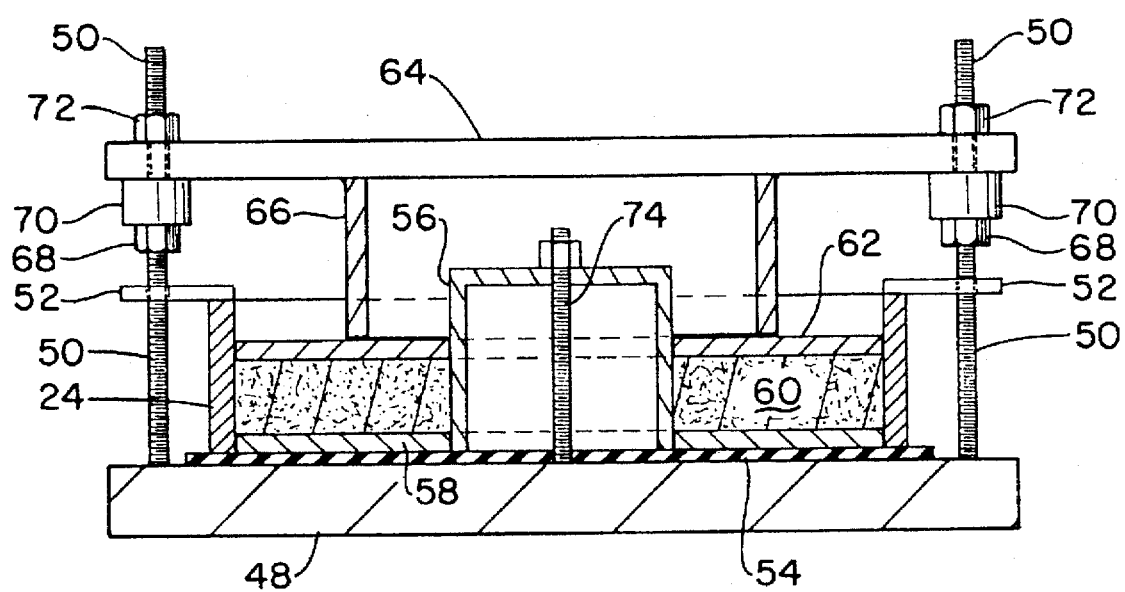
FIG. 2 is a partial cross sectional view of the disc forming mixture of the invention.

With reference now to FIG. 2, an appreciation of certain of the specific details of the formation of the carbon disc preform 42 can be obtained. As shown, the cylindrical die 24 is received upon a clamping plate 48 having a plurality of threaded rods 50 extending upwardly therefrom. In a preferred embodiment of the invention, four such threaded rods 50 are provided, but only two are shown in the cross sectional illustration of FIG. 2. Clamps 52 are threadedly received upon the rods 50 and are adapted to engage a top edge portion of the cylindrical die 24 to urge the bottom edge of the same into sealing contacting engagement with a rubber seal 54 received upon the clamping plate 48. The seal 54 is of an annular nature, adapted to lay under and receive a cylinder or tube 56 which is connected as by a bolt 74 to the clamping plate 48 and which is concentric with the cylindrical die 24, as shown in FIG. 2.

A bottom separator plate 58, comprising an annular disc, is received over the center cylindrical member 56 and within the cylindrical die 24 and rests upon the rubber seal 54, as shown. In the preferred embodiment of the invention, tight tolerances on both the inside and outside diameters of the bottom separator annular disc 58 assure a tight fit with both cylindrical members 24, 56.

During the operation of the process of the invention described above, carbon fiber 60, in the form of the strands 18, either continuous or cut, are received within an area defined between the inner and outer cylindrical members 56, 24 and, during the process of the invention, the fibers 60 are compacted within a cavity defined between the outer cylindrical die 24, the inner cylindrical member 56, the bottom separator plate 58, and a top separator plate 62 which is substantially identical to the bottom separator plate 58.

After the fiber 60 has been debulked by the plate 34, and the remainder of the resin 36 deposited therein, as necessary, the actual geometric configuring of the preform 42 is undertaken by the structure of FIG. 2. A compaction plate 64 is provided with apertures or holes for receipt by the threaded rods 50 and is further provided with a cylinder 66 extending from the plate 64 and about the center cylindrical member 56, as shown in FIG. 2. The cylinder 66 engages the top annular separator plate 62, urging the separator plate 62 toward the separator plate 58 by actuation of the nuts 72 upon the threaded rods 50. The final thickness of the preform 42 is achieved by the implementation of stops 68 which are threadedly received upon the rods 50, and spacers 70 supported by the stops 68. It will be appreciated that the height of the cylinder 66, taken in consideration with the positioning of the stops 68 and the height of the spacers 70 determines the maximum extension of the cylinder 66 toward the bottom separator plate 58 and, accordingly, establishes the height of the annular cavity defined between the separator plates 58, 62. Thicker or thinner discs may be achieved by changing the sizes of the spacers 70, or the location of the stops 68.

It will be appreciated within the concept of the invention that the actual compacting of the fibers 60 may be achieved hydraulically or pneumatically, with the nuts 72 simply serving to retain the compaction plate 64 in place, or the compaction itself may be undertaken by tightening of the nuts 72 and the resultant axial movement of the cylinder 66 with the plate 64, such cylinder 66 contacting and urging the top separator plate 62 toward the bottom separator plate 58.

It will be appreciated by those skilled in the art that the entire assemblage shown in FIG. 2 is placed in the convection oven 40 to achieve the desired resin cure.

According to the process of the invention, the die 24, clamped to the clamping plate 48 as by the clamps 52, is placed upon the carousel 26 and a first portion (preferably ⅓) of the resin is poured therein. The sleeve 22 is attached to the die 24 and the strands 18 of fibrous carbon material are dispensed by the injector head 20. During the dispensing operation, rotation and/or nutation of the die 24 is achieved by means of the motors 30 and/or 31. After a sufficient quantity of fibrous material has been dispensed, as determine by the scale 12, the dispensing operation is terminated and the fiber is cut as by the cutter 32. As discussed above, chopping of the fiber may have been regularly and continuously achieved by means of the cutter 32 during the dispensing operation, if desired.

With the fiber received within the die 24 and sleeve 22, the debulking operation is undertaken to compress the fibrous material totally within the annular die 24. The remainder of the resin 36 may then be added and the compaction operation, particularly employing the structure of FIG. 2, is then engaged. With the fibrous material and resin maintained between the separator plates 58, 62, a sequence of compaction and release is undertaken by forceful engagement of the compacting disc 64 and cylinder 66 with the top separator plate 62 and subsequent release thereof. The sequential compacting and releasing assures optimum compaction and disbursement and integration of the resin. Finally, compaction plate 64 is locked in place by means of nuts 72 such that an annular cavity of fixed dimension is defined between the plates 58, 62 and cylinders 24, 56. The assemblage is placed into the convection oven 40 for the curing operation. The die preform 42 is then carbonized as at 44 and densified as at 46. A final machining operation then achieves the complete structure of the brake disc 47.

When the apparatus and process of the invention are employed to fabricate a "dry preform," the top and bottom separator plates 58, 62 are preferably made of bulk graphite. The fiber 60 is compacted with the cavity without resin addition. While under compaction, separator plates 58, 62 are clamped to maintain the desired thickness. The fiber, plates, and clamps, as illustrated in FIG. 2, are then placed directly into a furnace for initial densification or heat treatment to relax the fiber 60 to retain a preform shape prior to final densification. In such a process, the oven 40 of FIG. 1 may be employed for initial densification, and the carbonizer 44 is eliminated. The separator plates 58, 62 are preferably removed after the initial densification step at 40, to facilitate the final densification as at 46.

It should now be readily apparent to those skilled in the art that the concept of the invention allows for the utilization of fibrous carbon material in its least expensive form, without the necessity of forming a prepreg, and while assuring the desired uniform distribution of the fibrous material throughout the preform generated thereby. Additionally, the labor intensity of the prior art is substantially reduced, since the process of the invention is automated.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention, reference should be made to the following claims.

What is claimed is:

1. Apparatus for making carbon discs for brake assemblies, comprising:

a source of continuous strands of resin-free carbon fiber material;

a die;

first means for feeding a measured quantity of said continuous strands into said die;

second means for compacting and retaining said continuous strands within said die, establishing a composition of resin-free carbon fibers in a geometric shape defined thereby;

densifying means for treating said composition with densifying material to maintain said geometric shape upon removal from said die; and wherein said die is cylindrical, having top and bottom separator plates defining a cavity therebetween, said cavity receiving said strands therein, and said top and bottom separator plates being axially movable with respect to each other, and a compacting plate adapted to lockingly engage said top separator plate for compacting said strands within said cavity into a configuration of a carbon brake disc.

2. The apparatus according to claim 1, wherein said first means comprises a scale in communication with said source of continuous strands.

3. The apparatus according to claim 2, wherein said first means further comprises a carousel receiving and rotating said die.

4. The apparatus according to claim 3, wherein said carousel nutates said die.

5. The apparatus according to claim 3, wherein said source of continuous strands comprises a plurality of spools of said continuous strands maintained upon said scale.

6. The apparatus according to claim 5, wherein said first means further comprises cutting means for cutting said continuous strands from said spools.

7. The apparatus according to claim 6, wherein said cutting means cuts a single piece of strand from each of said spools for deposit into said die.

8. The apparatus according to claim 6, wherein said cutting means cuts a plurality of pieces of strand from each of said spools for deposit into said die.

9. The apparatus according to claim 6, wherein said first means further comprises a despooler receiving said continuous strands from each of said spools and withdrawing said strands therefrom at a uniform rate.

10. The apparatus according to claim 9, wherein said first means further comprises an injector receiving said strands from said despooler and injecting said strands into said die.

11. The apparatus according to claim 9, wherein said second means comprises a compacting disc forcefully engaging said strands in said die and debulking said composition therein.

12. The apparatus according to claim 1, wherein said die further comprises adjustable stops engaging said compacting plate and thereby defining a depth of said cavity, said depth establishing a width of said carbon brake disc.

13. The apparatus according to claim 1, wherein said die receives a resinous material prior to receiving said continuous strands.

14. The apparatus according to claim 13, wherein said die partially receives said resinous material prior to receiving said continuous strands and receives the remainder of said resinous material after said second means compacts said continuous strands.

* * * * *